Feb. 5, 1929.                J. T. SIBLEY                 1,700,777
                          WINDSHIELD WIPER
                        Filed July 12, 1924            2 Sheets-Sheet 1
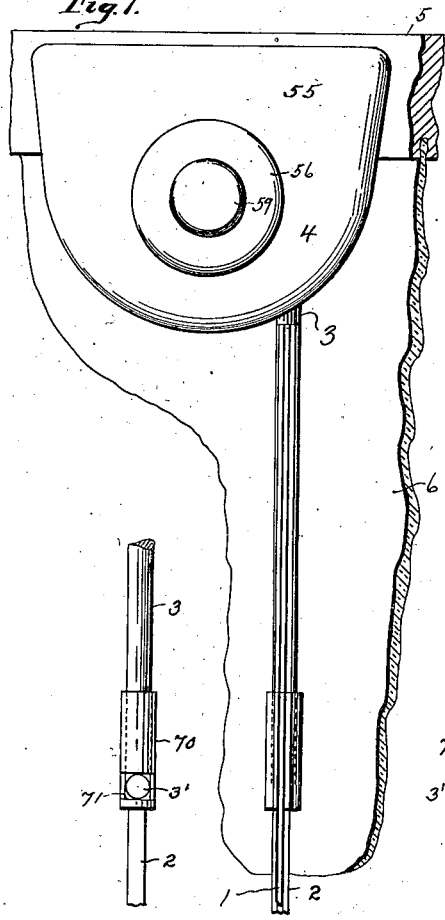
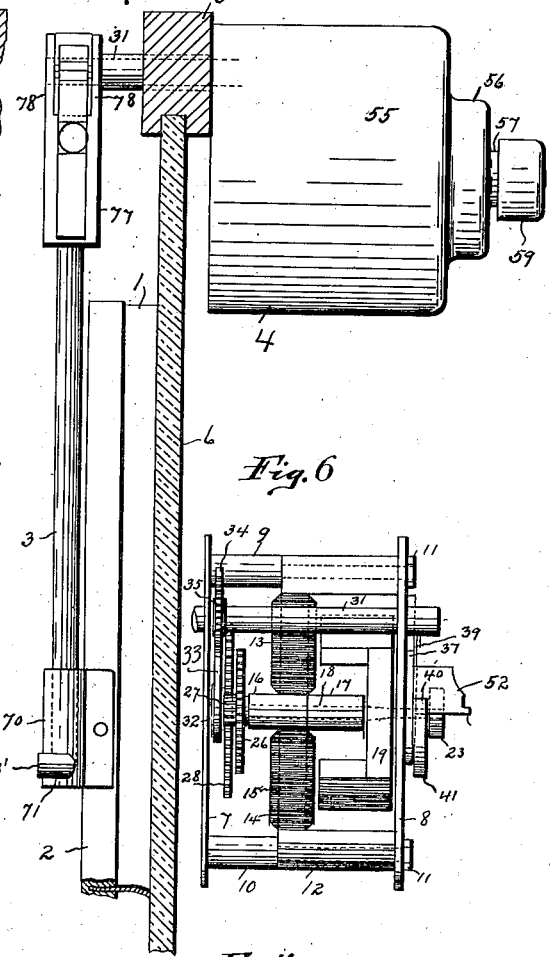
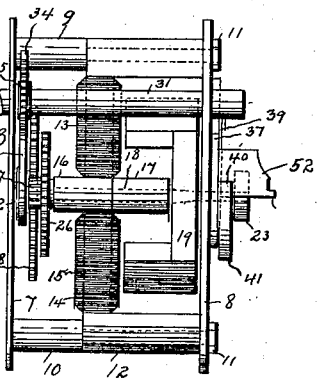
INVENTOR
J. T. Sibley
By Louis M. Sanders
ATTORNEY.

Feb. 5, 1929.
J. T. SIBLEY
1,700,777
WINDSHIELD WIPER
Filed July 12, 1924   2 Sheets-Sheet 2
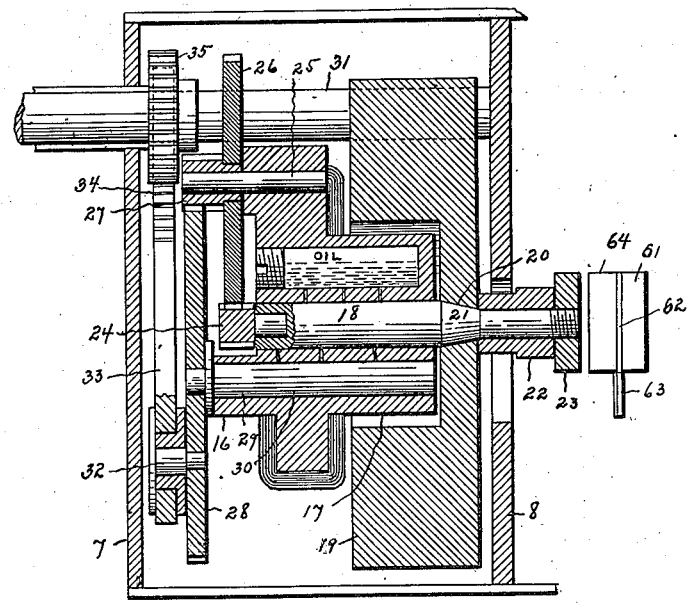
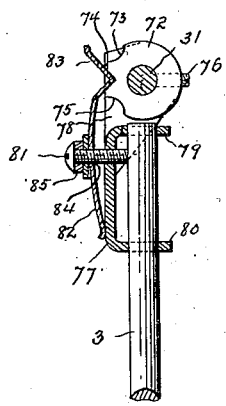
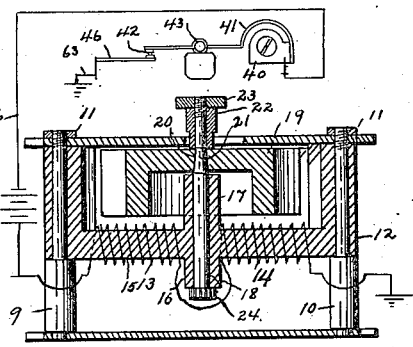
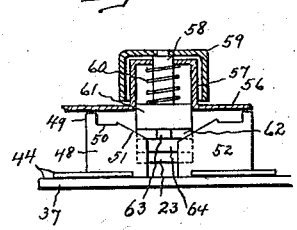
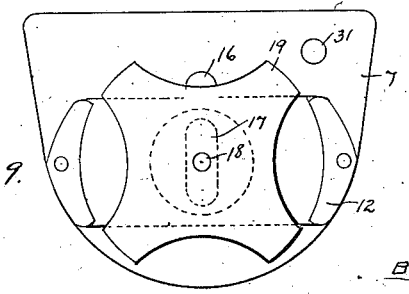
J. T. Sibley
INVENTOR.
By Louis M. Sanders
ATTORNEY.

Patented Feb. 5, 1929.

1,700,777

UNITED STATES PATENT OFFICE.

JAMES T. SIBLEY, OF NEW YORK, N. Y., ASSIGNOR TO S. & U. HOLDING COMPANY, INC., OF NEW YORK, N. Y., A CORPORATION OF NEW YORK.

WINDSHIELD WIPER.

Application filed July 12, 1924. Serial No. 725,617.

The object of my invention is to produce a simple, practical and efficient windshield wiper, in which an oscillating wiping rod is used which carries a wiper to frictionally engage the surface of a wind-shield, the wiper and rod being connected so as to have a transverse rocking connection which is simple and strong, and which permits the wiper to readily adjust itself to the glass of the shield, and permits a certain amount of lost motion by which at each reversal of the direction of movement of the rod, the wiper rocks and has a dragging engagement with the glass. Another object of my invention is to improve the connection between the wiper and its carrying shaft, by making this connection in the form of a yielding clutch which under ordinary circumstances is sufficient to drive the wiper, but which will yield for the purpose of permitting the wiper to be manually thrown out of the line of vision, and which will also yield in case the motor which drives the wiper tends to run too fast in connection with the wiper movement, or in case the resistance of the wiper is too great, thereby permitting a slipping movement by which the motor is saved from injury, and which will cause it to pick up and actuate the wiper subsequently, all of which will be hereinafter described.

Fig. 1 is an inside or rear view of the wiper shown as attached to a fragmentary part of a windshield.

Fig. 2 is a side elevation of the same with the windshield in section.

Fig. 3 is the forward or front side of the interior mechanism of the motor case with the supporting plate removed.

Fig. 4 is a side elevation of the motor showing the enclosing cover in section.

Fig. 5 is a rear view showing the contact breaker and its supporting plate removed from the case.

Fig. 6 is a plan view of the motor with cover removed.

Fig. 7 is an enlarged vertical section of the motor showing the arrangement of the several parts.

Fig. 8 is a horizontal section through the motor shaft showing the arrangement of the field magnet and armature, and also showing in diagram the wiring plan.

Fig. 9 is a front elevation of the field magnet and armature showing their outline plan.

Fig. 10 illustrates in vertical section the details of the connection between the wiper shaft and the wiper rod.

Fig. 11 is an elevation of the starting switch showing the starting contact in rectified plan.

Similar reference numerals refer to like parts throughout the specification and drawing.

In a windshield wiper it has been found that a thin strip of rubber passed rapidly back and forth across the front face of an automobile windshield will quite effectively remove moisture, snow, or dust so as to render the line of vision of the chauffeur unobstructed. In order that the strip of rubber may be oscillated back and forth in the arc of a circle I mount such a strip 1, with its metallic channel shaped protector 2 at the end of a swinging arm 3, the oscillation of said arm being effected by means of a motor 4 secured to the upper rail 5 of the windshield, the glass 6 of which is held in said frame. The wiper is so arranged as to swing with the strip of rubber 1 in contact with the outer or weather face of the glass. The motor 4 has a front plate 7 and a back plate 8 of the same dimensions and of general U shape in outline as shown in Fig. 3. These plates are spaced apart and held together by means of the spacing posts 9, 10 each of which is riveted in the front plate 7 with the back plate 8 secured on the outer ends of said posts by means of the nuts 11. The field magnet 12 of the motor is supported on the two posts with its pole pieces extending forward. The field coils 13, 14 are wound upon the middle element 15 of the field magnet, in the center of which element there is a forward projection 16 and a rearward projection 17. Centrally through these two projections and concentric with the field magnet poles is the armature shaft 18. Upon the inner end of this shaft is a four pole armature 19, the poles of which swing in close proximity to the field magnet pole pieces. The armature is secured to the armature shaft by means of the tapered hole 20 fitting closely the coned part of the shaft as at 21 with the four-lobed cam 22 and the starting disc 23 serving as a nut to force said armature into rigid connection with said shaft. Upon the forward end of said shaft where it extends outside of the projection 16 is a small pinion 24 and journaled into the upper part of the projection by means of a long stub shaft 25 is a gear 26 in engagement with said pinion 24. Outside of the gear and rigidly connected therewith is a small pinion 27 meshing with a large gear 28, the latter mounted upon a stub shaft 29 journaled in a bearing 30 in the lower part of the projection 16. The rotation of the armature 19 will be communicated through the gear train just described at a considerably reduced rate so that while the speed of the motor is very high this reduction is such as to bring the rotation of the gear 28 down to between 40 and 50 revolutions.

In the upper part of the case and journaled in the end plates 7, 8 is the wiper shaft 31 extending through the front plate 7 and also through the upper windshield rail 5 and carrying on its exposed end the wiper rod 3. As a means for oscillating the shaft 31 and with it the rod 3 I employ the following construction: Upon the face of the gear 28 I mount a crank pin as 32 upon which is a sort of connecting rod 33 having a rack 34 at its outer end in mesh with a pinion 35 rigidly secured to the shaft 31. A small flanged idle roller 36 is mounted upon the adjacent part of the front plate 7 or in any convenient place to bear upon the back of the rack and thus maintain its engagement with the teeth of the pinion 35. From this structure it will be seen that the rotation of the wheel 28 will be communicated to the oscillating wiper shaft 31.

Upon the rear side of the end plate 8 I mount the contact breaker mechanism. This consists of a sheet of insulating material, as fiber 37, secured in place by means of a screw 38 to the back plate 8, so that it may swing around said screw 38 as a center for purposes of adjustment. Upon this plate and underneath the screw 38 is the base 39 having its upper edge 40 upturned and cut away as shown, with the cut away portion bent in a semi-circle, as at 41, and extending vertically beyond the contact cam 22 and having at its lower end a contact point 42. Immediately adjacent to the contact cam 22 I insert in a loop formed in the contact spring 41, a small cylinder of fiber as 43 for engagement with the periphery of the substantially square contact cam 22 so that as the contact cam 22, which, it will be remembered, is secured on the end of the armature shaft and rotates therewith, will cause the spring contact 41 to oscillate back and forth as said cam rotates. Upon the insulating base 37 I also mount a second contact base 44 securing the same in place by means of the screw 45. The outer end of this contact base 44 is upturned and cut away to form a contact spring 46 at the outer end of which is a small contact point 47 in position to be engaged by the contact 42 above referred to, so that as the cam 22 rotates the contact between the two elements 42, 27 will be closed and broken alternately. The contact base 44 has also an upturned element 48 the upper edge of which is concentric with the armature shaft 18; at its outer edge the element 48 has a stop projection 49 immediately adjacent to which is a small shoulder 50, the edge of said element being completed by the cam shaped incline 51. In order to increase the tension of the spring 41 so as to overcome the inertia of the long overhanging contact arm, I provide a small coil spring 41' connecting the same to the spring 41 and to the upstanding projection 48 through an insulating element 48'. In this manner the rapid rotation of the contact cam 22 will be responded to by the spring contact arm 41 without the jumping effect which such rapid rotation might otherwise produce. Upon the base 37 and concentric also with the shaft 18 is another upstanding element 52 secured to said base by means of a screw 53, the purpose of which will be hereafter described.

The motor is provided with a cover 55 made of metal drawn or pressed into cup shape to conform with the outlines of the front and back plates 7, 8 so that it may be slipped over said plates and secured in place to protect the mechanism of the motor. The bottom or inner end of the cover 55 is provided with a dome shaped boss 56 from the center of which a second dome shaped boss 57 projects. Extending through the aperture in the boss 57 is a starting shaft 58 to the outer end of which the turning knob 59 is secured. Within the boss 57 and surrounding the starting shaft 58 is a spring 60 bearing between the outer end of the boss 57 and a collar 61 secured to the inner end of said starting shaft. Next, inside of the collar, is secured a metal disc 62 having a contact point or projection 63 thereon said contact projecting radially into the path of the upper edge of the projections 48, 52. Secured also upon the end of the starting shaft 58 is a rubber disc 64 in position to engage the starting disc 23. From this description it will be noted that when the knob 59 is turned so that the projection 63 lies between the projections 48, 52 the spring 60 will force the shaft 58 endwise to bring the rubber disc 64 into engagement with the starting disc 23. It will be noted that there is considerable space between the projection 63 and the inclined projection 48 so that the knob 59 will be given a considerable turn before the projection 63 engages the part 51 of the projection 48, and while such turning is taking place the rubber disc 64 will be in engagement with the face of the starting disc 23 so as to turn the motor shaft 18 with it. A further turning of the knob 59 will cause the projection 63 to engage the inclined portion 51 of the projection 48 and ride up on the same until it reaches the ledge 50 and engages the stop projection 49 so that when in such position the rubber disc 64 will have become completely disengaged from the starting disc 23. The act of turning the knob as just described will be sufficient to give the motor shaft 18 and the armature 19 a starting impulse. It will also break the contact between the two elements 42, 47 by reason of the turning of the cam 22 so that as the small cylinder 43 rides over the corner of said cam the spring 41 will add another slight impulse of the turning of the shaft 18 so as to continue the rotation and thus close the contact 42, 47. In this manner the current through the field magnet is alternately opened and closed thereby giving a succession of magnetic fluxes through the field magnet and producing a succession of magnetic impulses to the poles of the armature to maintain its rotation. The running position for the device will be with the projection 63 resting upon the shoulder 50 of the projection 48. When the device is not in use the knob 59 may be turned so as to carry the projection 63 upon the opposite idle projecting element 52 so as to be what may be termed the safety position.

The circuit connections for operating the device are clearly shown in Fig. 8. The field coils 13, 14 are connected through the battery B from which the wire connection 66 leads to the base 40. When the connection 42, 47 is closed the circuit will be completed through the spring 46, base 44, projection 48, and projection 63 thence through the starting shaft 58 to the cover 55 which is grounded upon the frame of the windshield. The other end of the coil 65 from the field magnet is also grounded upon the frame so that the circuit will be completed.

In order that the rubber strip 1 may be given a wiper effect over the windshield glass 6, I provide a sort of oscillating connection between the channel strip 2 and the wiper rod 3. Referring to Fig. 2 it will be noted that the outer or lower end of the rod 3 is given a right angle turn as at 3'. The connection between the rod 3 and the channel strip 2 is made by means of the clip 70 which is wrapped around the lower end of the rod 3 and provided with a slot 71 which takes over the angular end 3' of the rod; the clip 70 then is riveted to the channel strip 2. The result of this construction is, that as the rubber strip 3 sweeps over the face of the windshield glass it will oscillate back and forth from side to side to the length of the slot 71.

As a convenient means for connecting the upper end of the rod 3 with the wiper shaft 31 I provide the following structure: Upon the outer end of the wiper shaft 31, I provide a small disc 72 which has the three notches 73, 74, 75, said disc being secured to the end of the shaft 31 by means of a set screw 76. Upon the upper end of the rod 3 is the clip 77 made of sheet metal and provided with a pair of apertured lugs 78, through which the end of the shaft 31 is inserted, so as to straddle the disc 72. The clip 77 has the two lugs 79, 80 inturned and apertured to receive the upper end of the rod 3, to which it is held by means of the set screw 81. Upon the back of the clip 77 is a flat spring 82, the lower end of which bears upon the back of the clip and the upper end is provided with an angular bend 83 in position to enter any one of the notches 73, 74, 75. The middle of the spring is provided with an aperture 84 through which the set screw 81 passes and the nut 85 is screwed down upon the back of the spring 82 to give it the necessary tension, so that the angular bent end 83 may press into one of the notches 73, 74, 75. When the angular end 83 is in the notch 74 the connection is sufficiently rigid to permit the shaft 31 to oscillate and swing the rod 3 over the face of the windshield glass 6. If, however, it is desired to throw the wiper out of the line of vision that is, from a vertical to a horizontal position it is only necessary to grasp the rod 3 and swing it forcibly so that the end 83 of the spring will be disengaged from the notch 74 and engaged into either of the notches 73, 75, this of course when the motor is not running.

It will be seen that the construction shown in Figure 10 and just described constitutes a slipping clutch connection between the driving shaft 31 and the wiper rod 3 which not only permits the adjustment of the wiper as described above, but which also permits the motor to over run the wiper without injury, because in case the motor runs too fast, or there is too much resistance momentarily to the shaft 31, the disc 72 acting as a clutch, will slip past the member 83 and run for a few revolutions idle, and no injury will result

I claim:—

1. In a windshield wiper, the combination of a wiper shaft, means for oscillating said shaft about its axis, a notched disc secured to the end of said shaft, a clip having a pair of apertured lugs integral therewith and mounted upon said shaft with one of said lugs on each side of said disc, and a spring secured to said clip said spring having an angular bend in one end thereof adapted to fit in the notches in said disc, whereby said clip is resiliently secured to the end of said shaft, and a wiper rod and wiper secured in said clip to oscillate therewith.

2. An article of the kind described, comprising a rotatable shaft, a wiper element, a rod connected to the wiper element and a slip clutch connected to the shaft and removably suspending the rod, said clutch operating to resiliently latch the rod in a plurality of angular positions with respect to the shaft.

3. An article of the kind described, comprising a rotatable shaft, a wiper element, a rod connected to the wiper element and a slip clutch connected to the shaft and removably suspending the rod, said clutch operating to resiliently latch the rod in a plurality of angular positions with respect to the shaft, said clutch having a member controlling its latching action and removably fastening the rod in the clutch.

JAMES T. SIBLEY.